United States Patent [19]

Tse

[11] 4,377,495
[45] Mar. 22, 1983

[54] REGENERATION OF SULFUR-CONTAMINATED PLATINUM-ALUMINA CATALYST

[75] Inventor: Harold F. Tse, Kearny, N.J.

[73] Assignee: Engelhard Corporation, Iselin, N.J.

[21] Appl. No.: 357,030

[22] Filed: Mar. 11, 1982

[51] Int. Cl.[3] .................... B01J 23/96; B01J 21/20; C10G 35/08

[52] U.S. Cl. .................................. 252/415; 208/140; 252/411 S

[58] Field of Search ............... 252/415, 414, 411 S, 252/416; 208/140

[56] References Cited

U.S. PATENT DOCUMENTS

| | | | |
|---|---|---|---|
| 3,622,520 | 11/1971 | Hayes | 208/140 |
| 3,673,109 | 6/1972 | Georgescu et al. | 252/415 |
| 3,935,244 | 1/1976 | Hayes | 252/415 |
| 4,155,836 | 5/1979 | Collins et al. | 252/411 S |
| 4,191,633 | 3/1980 | Dauber | 208/140 |

Primary Examiner—P. E. Konopka

[57] ABSTRACT

Platinum-alumina catalysts deactivated by accumulations of sulfur and carbonaceous deposits are treated for removal of sulfur by contacting the deactivated catalyst with a hydrogen-rich gas, water or water precursor, a solution of liquid chlorinated hydrocarbon containing one to eight carbon atoms per molecule, in an oxygen-containing organic compound containing one to eight carbon atoms per molecule prior to contacting the deactivated catalyst with oxygen-containing regeneration gas for removal of coke deposits from the catalyst.

10 Claims, No Drawings

REGENERATION OF SULFUR-CONTAMINATED PLATINUM-ALUMINA CATALYST

This invention relates to a process for regenerating a sulfur-contaminated catalyst comprising platinum on an alumina support. In one of its more specific aspects, this invention relates to an improved method for regeneration of a sulfur-contaminated hydrocarbon conversion catalyst comprising platinum on alumina wherein coke is removed from the catalyst by combustion with an oxygen-containing gas.

Solid particulate contact catalysts comprising platinum on an alumina support are employed in a number of hydrocarbon conversion reactions including hydrotreating and reforming operations wherein a gasoline or naphtha fraction from petroleum is contacted in a reaction zone with a solid contact catalyst having a hydrogenation-dehydrogenation component comprising platinum. During the reforming reaction, carbonaceous deposits, usually referred to as "coke", accumulate on the catalyst, causing the activity and sometimes the selectivity of such catalysts to decline. These catalysts may be regenerated to restore their activity and selectivity by burning the coke deposits from the surface of the catalyst particles in an oxidizing atmosphere comprising about 0.5-2 volume percent oxygen in admixture with an inert gas, such as nitrogen or flue gas, which is free of combustible components, such as hydrogen or hydrocarbons.

During normal usage, platinum catalysts are often contaminated with a minor amount of sulfur from the hydrocarbon feedstock undergoing conversion. Severe sulfur contamination of platinum catalysts can result from the use of high-sulfur naphtha feedstocks as charge to the process or from a malfunction of a hydrodesulfurizer employed to pretreat the feedstock before its introduction into a reactor containing a platinum-alumina catalyst. In the case of catalysts sulfided during naphtha reforming operations, sulfur is generally present on the catalyst as a sulfide. Sulfide compounds may also be present on the walls of the reactor as a result of reaction of hydrogen sulfide with iron or iron oxide to form iron sulfide.

The presence of sulfur compounds in the reaction zone is detrimental to the catalyst in that the sulfides are converted to sulfate ions or compounds during the regeneration of the catalyst. The mechanism by which this takes place is believed to involve oxidation of the sulfide to sulfur dioxide and to sulfur trioxide, which react with alumina to form sulfate ions adhering to the alumina substrate of the catalyst. The resulting sulfates or sulfation of the catalyst reduce the activity of the catalyst during the next succeeding on-stream reforming cycle. During the on-stream reforming cycle, the sulfates are reduced to sulfides slowly and with relative difficulty.

U.S. Pat. No. 3,622,520, teaches the stripping of sulfur from a platinum-containing catalyst contaminated with sulfur by treating the catalyst, before commencing the normal regeneration procedure, with hydrogen, water vapor and hydrogen chloride or an organic chloride.

It has now been discovered that sulfur may be more effectively removed from a platinum-containing catalyst employed for catalytic conversion of a hydrocarbon feedstock in an atmosphere of hydrogen by a treating step in which the sulfur-contaminated catalyst is contacted with a fluid mixture of hydrogen-rich gas, liquid or gaseous water, a chlorinated hydrocarbon containing one to eight carbon atoms per molecule, and an oxygen-containing organic compound containing one to eight carbon atoms per molecule. The oxygen-containing organic compound is selected from the group consisting of hydroxylated compounds, ketones and ethers. The chlorinated hydrocarbons and the oxygen-containing compounds useful in the process are those which are normally liquid but which are gasiform at the pressure and temperature employed during the treating step. The treating step advantageously is carried out at the same temperature and pressure as those employed in the hydrocarbon conversion reaction utilizing the catalyst. The water and chlorinated hydrocarbon components are present in the treating mixture in an amount sufficient to provide water ($H_2O$) in the range of about 20 to about 80 mols $H_2O$ per atomic equivalent of chlorine. Sufficient oxygen-containing compound is employed to furnish about 5 to about 100 liquid volumes of such compound per liquid volume of chlorinated hydrocarbon.

The sulfur removal process of this invention may be used advantageously to treat any catalytic composition containing sulfur and a platinum-group metal of the type which may be employed in reforming or hydrotreating, and which comprises alumina as a base. The alumina may be substantially pure, or have admixed with it minor amounts of silica or other oxides or a zeolite. The alumina is typically eta or gamma alumina. The catalyst may also comprise one or more additional catalytic agents, such as rhenium, iridium, germanium or gallium. The process of the invention is particularly useful in treating platinum-rhenium on alumina catalysts, since such catalysts appear to be relatively extremely sensitive to contamination by sulfates.

The major constituent of the treating gas is hydrogen. This may be supplied in essentially pure form, but more normally will be supplied as low sulfur or sulfur free recycle gas stream obtained from the gas-liquid separator employed as an element of apparatus of the reforming or hydrotreating process. Such a recycle gas typically comprises about 75 to 95 mole percent hydrogen, with methane and other low molecular weight normally gaseous hydrocarbons making up the remainder.

The water employed in the process may be introduced in vapor or liquid form. Liquid water, if used, is quickly vaporized at the elevated temperatures employed in the process. If liquid water is employed, it optionally may be admixed with the oxygen-containing organic compound referred to hereinafter. Usually a part of the water required for the process is already contained in the hydrogen-rich recycle gas stream from the process. The recycle gas from the separator of a commercial installation will inherently comprise some water, and, depending upon the temperature and pressure conditions existing at the separator, the water content will be in the range of about 1000 to about 4000 ppm by volume of the recycle gas stream. If water from a different source is employed, sufficient water should be introduced into the hydrogen-rich stream to provide a concentration in the same range, preferably about 2000 ppm of the flowing treating gas.

The chlorinated hydrocarbon and the oxygen-containing compound employed in the process are liquids miscible with one another at normal atmospheric temperature and pressure conditions. In the method of this invention, the chlorinated hydrocarbon is mixed with the oxygen-containing organic compound and the resulting solution introduced into the hydrogen-rich stripping gas. Both types of compounds may contain one to eight carbon atoms per molecule, with the lower molecular weight compounds preferred because of their ready availability.

Any of a large number of chlorinated hydrocarbons and oxygen-containing compounds may be employed in the process of this invention. The miscibility of any particular combination may be readily determined by routine experimentation. The vapor pressures and boiling points of the various compounds may be determined by routine experimentation, or by calculations based upon data available in the literature.

The chlorinated hydrocarbon may contain one or more chlorine atoms per molecule. These compounds may be derived from paraffins, and include especially methyl chloride, methylene chloride, chloroform, carbon tetrachloride, ethylene chloride, dichloro-ethane, trichloro-ethane, propyl chloride, propylene dichloride, and butyl chloride. The compounds may also be derived from cycloparaffins, e.g., chlorocyclohexane, or from olefins, or from aromatics, e.g., dichlorobenzene or chlorotoluene. Olefinically unsaturated chlorinated hydrocarbons are hydrogenated to the corresponding saturated compound when exposed to the hydrogen-rich atmosphere at the temperature and pressure conditions existing during the treating process and in the presence of the platinum-containing catalyst. Aliphatic chlorinated hydrocarbons having 1 to 4 carbon atoms per molecule, and aromatic chlorinated hydrocarbons having 6 to 8 carbon atoms per molecule are preferred. Carbon tetrachloride, dichloro-ethane and trichloro-ethane are preferred species of chlorinated hydrocarbons.

The amount of the chlorinated hydrocarbon employed for removal of sulfur from the catalyst in the process of this invention is related to the amount of water employed in the process. The relative proportions of chlorinated hydrocarbon and water employed are in the range of about 20 to about 80 mols, preferably in the range of about 25 to about 50 mols, of $H_2O$ per atomic equivalent of chlorine. For example, at a $H_2O$ to Cl ratio of 20, methyl chloride ($CH_3Cl$) is introduced at the rate of one mole for each 20 moles of $H_2O$ supplied to the process. If carbon tetrachloride is employed, only one fourth as many mols will be required, as it contains four atoms of chlorine per molecule.

The oxygen-containing compound may be selected from the class consisting of hydroxylated hydrocarbons, ketones or ethers. Typical preferred hydroxylated compounds include alcohols, e.g., methanol, isopropyl alcohol, hexanol and octanol, and diols, e.g., ethylene glycol. Hydroxylated compounds which may be derived from paraffins include methanol and isopropanol, those from cycloparaffins include cyclohexanol, while phenol or a xylenylol may be derived from aromatic hydrocarbons. Isopropanol and methanol are readily available and inexpensive oxygen-containing organic compounds preferred for use in the process.

Illustrative ketones which may be employed in the process are acetone and methyl-ethyl ketone; methyl-ethyl ketone is preferred. Illustrative ethers include diethyl ether and methyl-phenyl ether.

The amount of the oxygen-containing compound to be employed in the process is related to the amount of the chlorinated hydrocarbon. The relative proportions of oxygen-containing compound and chlorinated hydrocarbon employed are within the range of about 5 to about 100 liquid volumes, preferably in the range from about 10 to about 20 liquid volumes, of oxygen-containing compound per liquid volume of chlorinated hydrocarbon.

Various combinations of chlorinated hydrocarbons and/or of oxygen-containing organic compounds may be employed in the process including mixtures of carbon tetrachloride and dichlorobenzene; isopropanol and methyl-ethyl ketone; isopropanol and ethylene glycol; and the like.

During the treating process, the reaction zone is maintained at an elevated temperature in the range of about 260° C. to about 540° C. (500° to 1000° F.), preferably in the range of about 430° C. to about 540° C. (800° to 1000° F.). As temperature is increased within these ranges, the rate of sulfur removal increases. In general, therefore, higher temperatures within these ranges are preferred. However, the temperature should not be so high as to risk damage to the catalyst.

The pressure employed during the treating process may be in the range of about 4.5 to 53 bar (50 to about 750 psig). As a practical matter, the pressure employed is essentially the same as the pressure employed in the main process reaction, such as reforming or hydrotreating, as it is inconvenient and relatively uneconomical to increase the pressure of the recycle gas employed in the treating process of this invention relative to the pressure maintained in the main reaction, or to decrease the pressure during the treating process and thereafter recompress the effluent gas for further use.

The duration of the sulfur removal treating process depends upon the amount of sulfur on the catalyst and the extent to which it is to be removed. At the start of the treating process, the sulfur content (as hydrogen sulfide) in the effluent gas from the catalyst is typically in the range of about 500–2000 ppm by volume. As the process is continued, the hydrogen sulfide concentration and the effluent gas stream declines. The sulfur removal treatment may be discontinued when the hydrogen sulfide content of the effluent gas stream reaches a prescribed level, typically the range of about 25–100 ppm. Prolonged continuation of the treating process will effect the removal of additional amounts of sulfur from the catalyst but the benefit of the removal of additional incremental amounts of sulfur is not usually economically justified in view of the cost of further treatment and non-productive down time of the process.

The effluent withdrawn from the system during the sulfur removal process is preferably passed through an alkaline solution, such as an aqueous sodium hydroxide solution, to remove sulfur compounds and prevent the discharge of hydrogen sulfide-containing gases to the atmosphere. A part of the desulfurized hydrogen-rich gas is recycled back to the reaction zone.

After the sulfur removal treatment has been completed, the reaction zone is purged of combustible gases, and thereafter the catalyst may be regenerated and/or rejuvenated by known procedures employing a gas containing molecular oxygen.

In the following examples, a commercial grade platinum on gamma-alumina catalyst employed in reforming a high sulfur naphtha is regenerated by various methods. The virgin catalyst comprises 0.35 weight percent platinum, and 1.0 weight percent of atomic chlorine on a particulate alumina base and has a surface area of about 215 $M^2/g$. A one inch diameter test reactor is charged with 25 grams of catalyst admixed with alphaalumina granules to provide a catalyst bed depth of 30 inches. A high sulfur naphtha having the following physical and chemical characteristics is subjected to reforming with this catalyst.

| Naphtha Charge | |
|---|---|
| Sp. Gravity, °API | 53.7 |
| Distillation, °F. (ASTM D-86) | |
| IBP | 228 |
| 10 | 250 |
| 50 | 296 |
| 90 | 350 |
| 95 | 370 |
| EP | 384 |
| Composition | |
| Paraffins, vol. % | 49.2 |
| Naphthenes | 41.7 |
| Aromatics | 9.1 |
| Sulfur, ppm by wt. | 220 |

The initial reforming cycle before regeneration of the catalyst is conducted at 18.25 bar (250 psig) at a 3.0 naphtha to catalyst weight hourly space velocity (WHSV), and with a hydrogen-rich recycle gas ratio in the range of 3:1 to 5:1 moles $H_2$/moles hydrocarbon feed. The initial reforming cycle is conducted under isothermal conditions, with control of the reaction temperature to yield a product $C_5+$ reformate having an unleaded Research Octane Number of 100. The reactor bed temperature is in the range of 499° to 502° C. (930° to 935° F.) at the start of the reforming cycle and is increased as necessary up to about approximately 520° to 540° C. (970° to 1000° F.) to maintain the Research Octane Number of the product substantially constant as the catalyst ages. The water content of the recycle gas is controlled by passing the recycle gas through a dessicant bed of a 3 Å zeolite. During the reforming cycle, the water vapor and hydrogen sulfide concentrations in the recycle gas from the separator average about 50 ppm of water vapor by volume and 600 ppm (estimated) of hydrogen sulfide by volume.

Separate portions of the used catalyst are regenerated by the procedures described below.

EXAMPLE 1

After termination of the naphtha reforming cycle, a portion of the catalyst is regenerated and rejuvenated by burning coke from the catalyst using the following procedure, which is known in the prior art. The reactor is purged of combustibles, the catalyst cooled to about 425° C. (800° F.) by continued circulation of recycle gas, and the coke is initially burned therefrom employing 0.7% oxygen in an inert gas at 12.6 bar (200 psig) and a reactor inlet temperature of 425° C. The temperature, pressure and oxygen concentration are thereafter individually increased in known manner until the coke is burned from the catalyst. The regenerated catalyst is purged with hydrogen and its chloride content restored by the addition of carbon tetrachloride to the hydrogen feed and recycle stream.

This portion of the catalyst when returned to reforming service is not sufficiently active to produce 100 Research Octane Number $C_5+$ reformate.

EXAMPLE 2

In this example, sulfur is stripped from a second portion of the catalyst by the introduction into the reactor of sulfur-free recycle gas at 525° C. (about 975° F.) and 18.25 bar (250 psig) at a volume hourly space velocity (VHSV) of about 5700. Additional water is added to the recycle gas to increase its concentration to 1800 ppm by volume.

The effluent recycle gas withdrawn from the reactor at the start of the sulfur stripping step contains about 800 ppm by volume of hydrogen sulfide, which declines to about 600 ppm after four days of sulfur stripping, at which time the sulfur stripping step is terminated. The catalyst is then regenerated by burning coke therefrom as in Example 1. At the end of the regeneration cycle, the catalyst is still so contaminated with sulfur as to be relatively inactive as compared with fresh catalyst.

EXAMPLE 3

A third portion of the catalyst is regenerated by the procedure of Example 2, except that a solution of one volume part of carbon tetrachloride to ten volume parts of isopropanol is continuously introduced into the reactor concurrently with the recycle gas in an amount sufficient to furnish 10 ppm by volume of carbon tetrachloride in the gas introduced into the reactor. The effluent recycle gas withdrawn from the reactor at the start of this stripping step contains about 1800 ppm by volume of hydrogen sulfide, which declines to about 50–100 ppm of hydrogen sulfide after 36 hours. After termination of the sulfide stripping step, the catalyst is regenerated as described in Example 1. The regenerated catalyst is employed in a second reforming cycle with a reformate yield and reactor temperature profile essentially the same as that of the first reforming cycle employing fresh catalyst.

EXAMPLE 4

Following the foregoing tests, the sulfur stripping procedure of Example 3 was tested experimentally in a full scale commercial plant for regeneration of a commercial platinum on alumina reforming catalyst. In this test, the reforming unit comprised three reactors in series. The first unit was loaded with 4000 pounds of catalyst and the second and third units, with 5000 and 16,000 pounds, respectively.

The feedstock to the reforming unit was water free and comprised approximately 49 percent paraffins, 39 percent naphthenes and 12 percent aromatics, all by volume, and contained an estimated 100 ppm sulfur and 10 ppm chlorides. During the first ten weeks of operation, no additions were made to the feedstock. During the eighth week, the selectivity of the catalyst began to change as indicated by decline in $C_3/iC_4$ components in the product and an increase in gas make. At the end of the tenth week, the chloride content of the catalyst was increased by the addition of 5 ppm methanol and 1 ppm Cl (as carbon tetrachloride), partially restoring the selectivity of the catalyst. After fourteen weeks of on-stream operation, the catalyst in the first two reactors began to decline rapidly in activity. At the end of the seventeenth week, the unit was taken offstream for regeneration or replacement of the catalyst.

Previous attempts to regenerate the catalyst employed in this unit were not successful. The sulfur stripping procedure of Example 3 was applied to this commercial scale unit. In this example, a stripping mixture comprising hydrogen, water vapor, carbon tetrachloride and methanol in the relative proportions set forth in Examples 2 and 3 was circulated through the three reactors in series prior to removal of coke deposits with oxygen-containing gas as in Example 1.

When the catalyst was returned to onstream reforming operations, it was found that its activity and selectivity were restored to normal operating levels.

It will be evident from the examples that the method of this invention greatly accelerates the rate of sulfur removal from alumina based hydrocarbon conversion catalysts comprising platinum which have been contaminated by sulfur compounds.

I claim:

1. In a method of regenerating a deactivated sulfur-containing hydrocarbon conversion catalyst comprising platinum on an alumina support by burning coke from said catalyst with an oxygen-containing gas wherein sulfur is removed from said catalyst prior to burning coke therefrom by contacting said deactivated catalyst at an elevated temperature in the range of 350° to 600° C. with a hydrogen-rich gas comprising liquid or gaseous water and a chlorine compound, the improvement which comprises removing sulfur from said catalyst by contacting said deactivated catalyst at said elevated temperature with a hydrogen-rich gas containing liquid or gaseous water and an oxygen-containing organic compound containing one to eight carbon atoms per molecule and selected from the class consisting of hydroxylated compounds, ketones and ethers and having dissolved therein a chlorinated hydrocarbon containing one to eight carbon atoms per molecule in relative proportions in the range of 5 to 100 volumes of said oxygen-containing organic compound for each volume of said chlorinated hydrocarbon, and maintaining the rate of addition of said oxygen-containing organic compound and said chlorinated hydrocarbon dissolved therein such that the relative proportions of water and said chlorinated hydrocarbon are in the range of about 20 to about 80 mols of water per atomic equivalent of chlorine, withdrawing from said zone an effluent gas stream containing hydrogen sulfide, and continuing said process until the hydrogen sulfide content of said effluent gas stream is reduced to a desired concentration.

2. The method according to claim 1 wherein said oxygen-containing compound is an alkanol.

3. The method according to claim 1 wherein said oxygen-containing compound is methanol.

4. The method according to claim 1 wherein said oxygen-containing compound is isopropanol.

5. The process of claim 1 wherein said oxygen-containing compound is methyl ethyl ketone.

6. The process of claim 1 wherein said chlorinated hydrocarbon contains one to four carbon atoms per molecule.

7. The process of claim 1 wherein said chlorinated hydrocarbon is carbon tetrachloride.

8. The process of claim 1 wherein said hydrogen-rich gas is recycle gas from the hydrocarbon conversion process.

9. The process of claim 1 wherein said catalyst is a naphtha reforming catalyst.

10. The process of claim 1 wherein the sulfur removal step is carried out at a temperature within the range of about 425° to about 540° C.

* * * * *